United States Patent Office 2,782,773
Patented Feb. 26, 1957

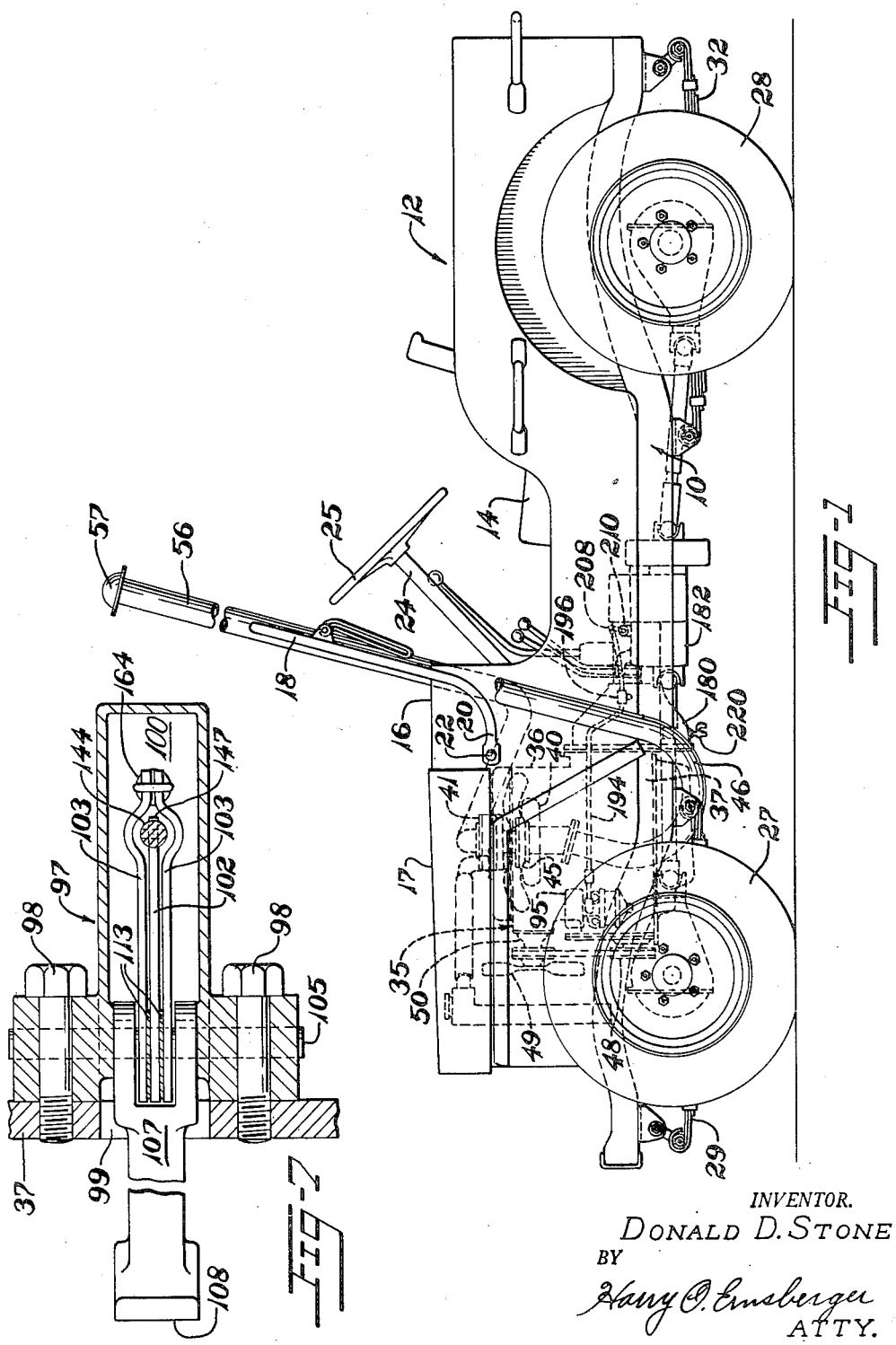

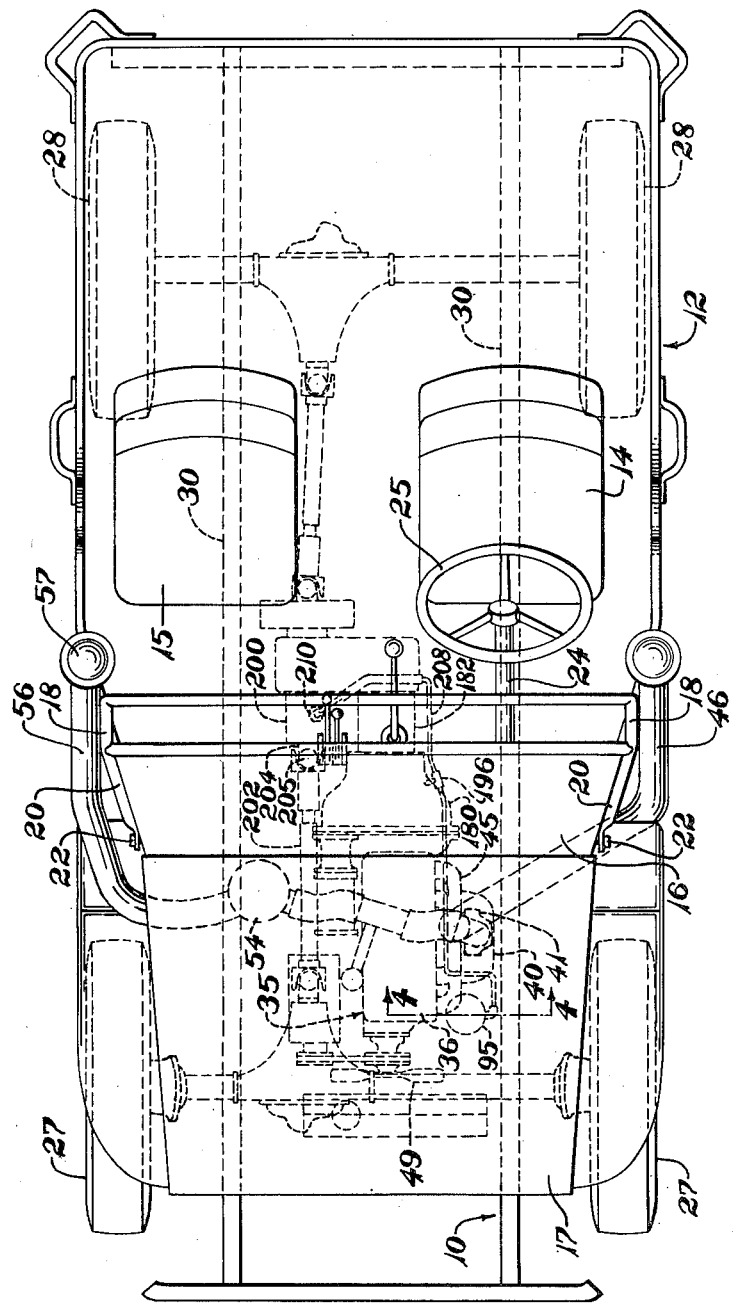

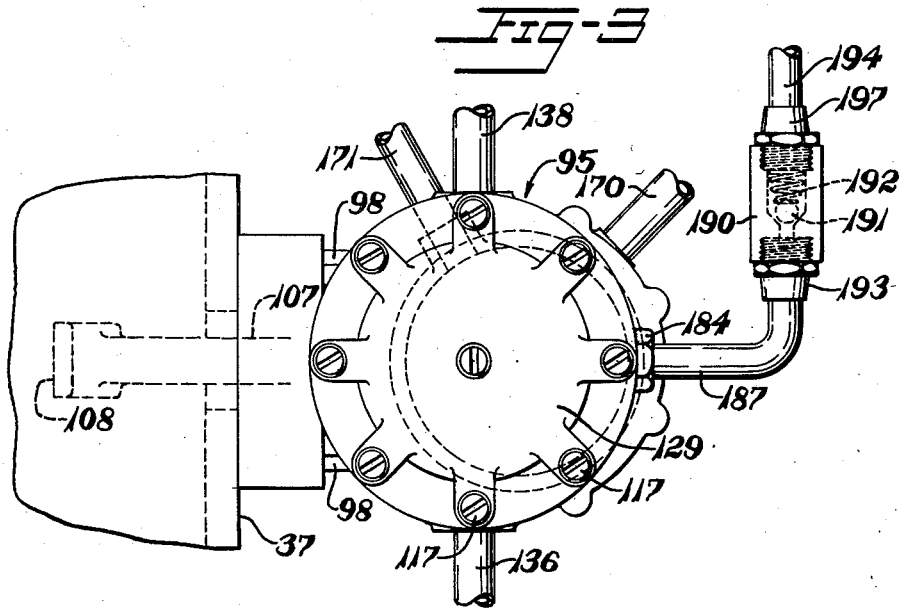
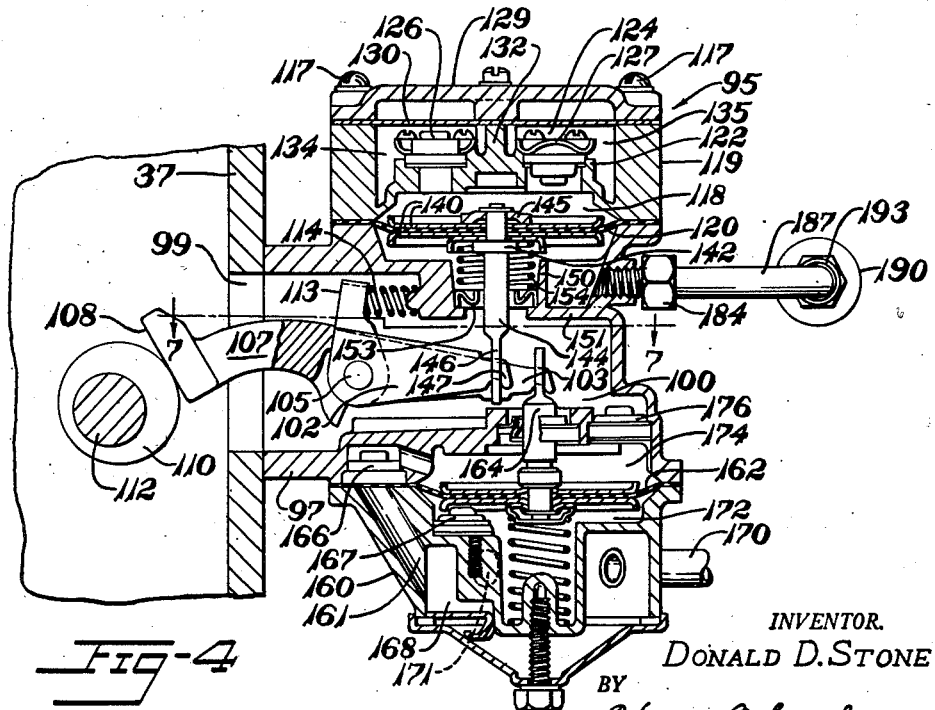

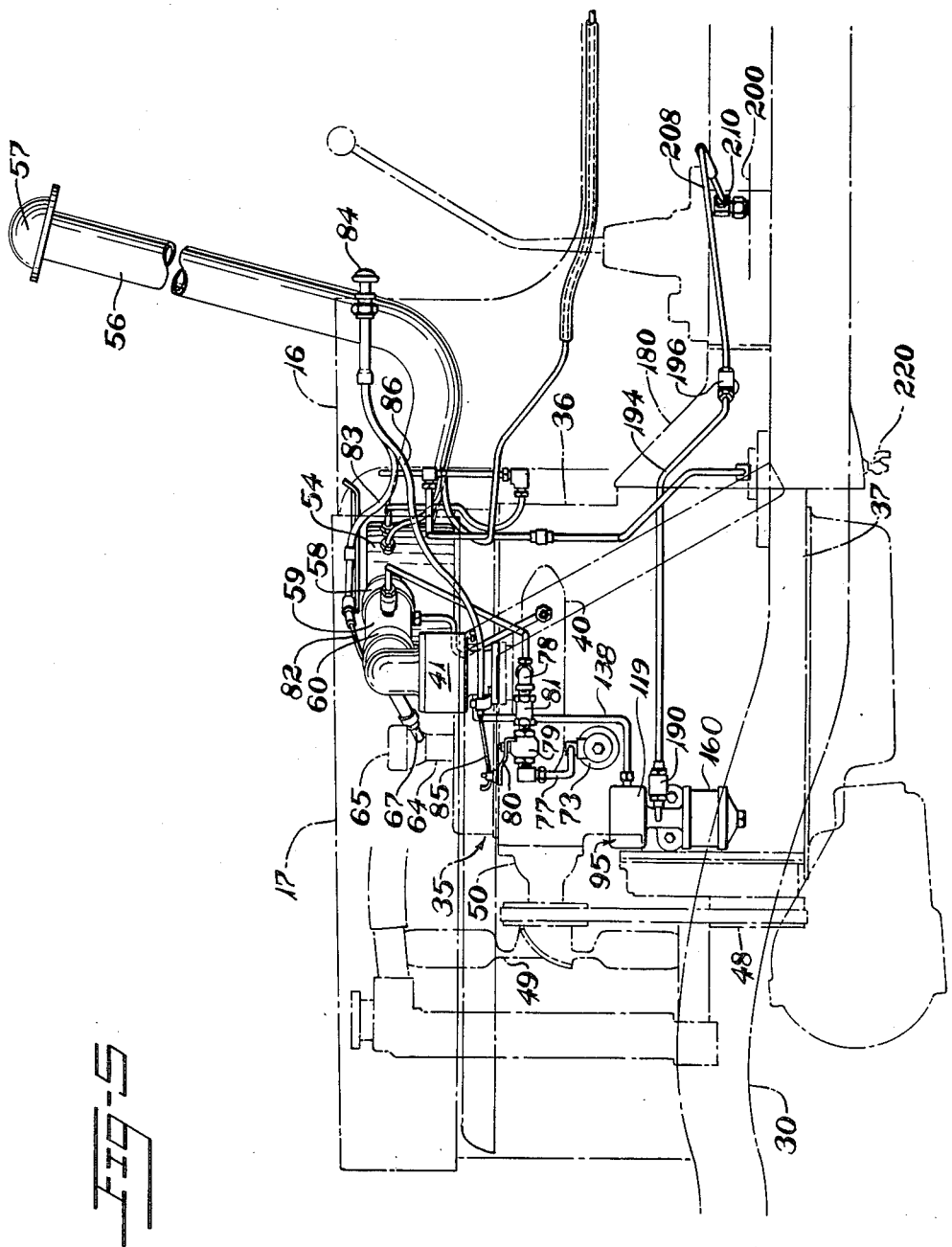

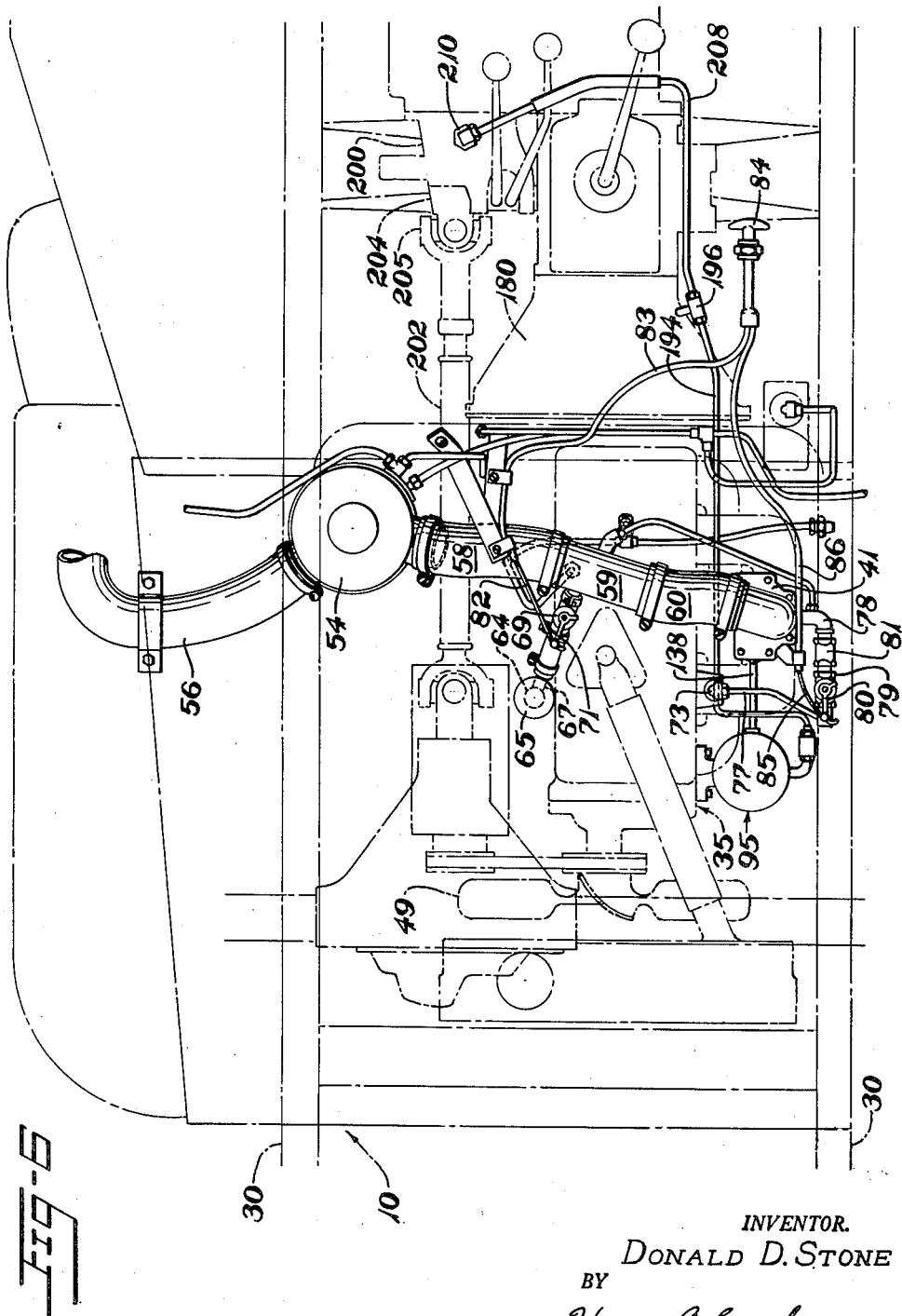

2,782,773

PRESSURIZING AND VENTILATING SYSTEM AND APPARATUS FOR INTERNAL-COMBUSTION ENGINES AND TRANSMISSION MECHANISMS

Donald D. Stone, Flint, Mich., assignor, by mesne assignments, to Bank of America National Trust and Savings Association, San Francisco, Calif., as agent Application August 18, 1953, Serial No. 374,969

8 Claims. (Cl. 123—1)

This invention relates to system and apparatus associated with an internal-combustion engine and power transmission mechanism of an automotive vehicle of a character rendering the engine and power transmission mechanism capable of operation while immersed or submerged in water during stream-fording operations. The invention embraces a system and apparatus embodying means for establishing gas pressure in the engine crankcase and housings or chambers containing components of the drive or power transmission mechanism of an automotive vehicle to avoid ingress of water into the engine crankcase and chambers when submerged.

An object of the invention is the provision of means for establishing gas pressure in the engine crankcase and valve compartment and in one or more housings or chambers containing drive mechanism for preventing or minimizing the entrance of water which would otherwise seep into the housing or housings at the journals of shafts extending through the housing or housings and at the connections of the housings with other components during submersion, the arrangement including control means for rendering the pressure means operative only when the engine and housings are submerged.

An object of the invention is the provision, with an internal-combustion engine and power transmission mechanism connected therewith, of a pumping means associated with a fuel-pumping means for establishing gas or air pressure in the engine crankcase and chambers containing the drive mechanism wherein the air or gas pump and fuel pump are operated by a single, engine-driven member.

Another object of the invention is the provision of means for controlling the establishment of gas pressure above atmospheric pressure in a clutch-enclosing housing and a transmission gear housing of an automotive vehicle to render the same capable of underwater operation and to avoid or minimize the liability of water seepage into the clutch and transmission gear housings, the arrangement embodying means for normally venting or causing air flow through the engine crankcase and valve compartment of an engine when the engine is not submerged.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view illustrating a form of vehicle embodying the system and apparatus of the invention incorporated therein;

Figure 2 is a plan view of the vehicle construction and apparatus shown in Figure 1;

Figure 3 is a top plan view of a pumping means forming a component of the pressurirzing system;

Figure 4 is a vertical sectional view through the pump construction, the view being taken on the line 4—4 of Figure 2;

Figure 5 is a side elevational view of the vehicle engine construction illustrating apparatus forming part of the pressurizing system;

Figure 6 is a plan view of the construction shown in Figure 5, and

Figure 7 is a detailed sectional view taken substantially on the line 7—7 of Figure 4.

The system and apparatus of the invention are especially adaptable for incorporation with an engine and enclosures or housings of power transmission mechanism of a vehicle to adapt or condition the engine crankcase and housing constructions of the power transmission mechanism for submerged or underwater operation. It has been a practice to provide for the establishment of exhaust gas pressure in a crankcase of an engine to adapt the same for submerged operation and to control the venting of an engine crankcase to adapt the same for normal land operation. A construction of this character is disclosed in U. S. Patent No. 2,429,732, issued to Delmar G. Roos on October 28, 1947. The arrangement of the Roos patent embodies means normally utilizing the subatmospheric or differential pressure existent in the intake manifold during engine operation for establishing a flow of air through the engine crankcase to scavenge the exhaust gases or piston "blowby" from the crankcase for normal land or unsubmerged operation and for interrupting the flow of ventilating air through the crankcase in a manner whereby the exhaust gases in the crankcase establish a pressure above atmospheric pressure to resist seepage of water into the crankcase along the crankshaft bearings, etc., when the vehicle is operated under water.

The arrangement of the present invention provides for introducing gases under pressure into the housing enclosing the clutch mechanism employed for establishing drive connection between the engine and the transmission gearing or gear set mechanism. The arrangement also includes a construction wherein gases are directed into the housing enclosing mechanism for establishing a drive to the front wheels to resist or prevent the ingress of water into the housing at the zones where the drive shaft or shafts enter the housing.

A form of construction of the invention is illustrated as embodied in a vehicle of the four-wheel-drive type. Referring initially to Figures 1 and 2, the vehicle embodies a chassis frame 10 which supports a body 12 provided with seats 14 and 15, cowl portion 16, hood 17 and a windshield frame 18. The windshield frame is preferably formed with projecting portions 20 arranged at each side of the cowl which are pivotally supported by means of pins 22 at the sides of the cowl construction whereby the windshield and frame can be folded forwardly adjacent the hood 17 if desired. A steering post 24 supporting a steering wheel 25 is provided adjacent the operator's seat 14. The vehicle is supported upon pairs of front and rear wheels designated 27 and 28, respectively, the front wheels being connected to the frame 10 by means of leaf spring assemblies 29 arranged adjacent each of the longitudinally extending frame members 30 of the frame 10. The rear wheels 28 are connected to the members 30 of the frame 10 by means of spring assemblies 32, one of each of the pairs of springs 29 and 32 being shown in Figure 1.

Disposed at the forward portion of the vehicle and within the hood 17 is an engine or prime mover 35, preferably of the internal-combustion type, the engine including a cylinder block 36 having a crankcase 37 within which are disposed the crankshaft, connecting rods and pistons (not shown) of conventional construction. An intake manifold 40 disposed at the side of the engine 35 supports a carburetor 41 for supplying fuel-and-air mixture to the cylinders of the engine.

The portion of the crankshaft of the engine extending forwardly of the crankcase is equipped with a pulley 48 for driving a cooling fan 49 and operating the water-circulating pump (not shown) contained within housing 50 secured at the forward end of the engine block 36. An air filter or cleaner 54 is connected to a tube 56 which projects upwardly to a point well above the upper portion of the windshield frame and is provided with a rain shield or cap 57.

The upper end of the tube 56 is open and provides a passage to convey air to the carburetor, the open end being arranged to project above the surface of water through which the vehicle may be driven. The exhaust manifold 45 is connected with a tube 46 which extends upwardly at the opposite side of the windshield frame 18, as shown in Figure 2, to convey exhaust gases from the engine for discharge above the water encountered in fording operations.

The air cleaner 54 is connected by means of tubes 58, 59 and 60 with a carburetor 41 for conveying filtered air from the cleaner into the carburetor 41. Disposed at one side of the engine block 36 is a tube or pipe 64 which is normally closed at its upper end by means of a cap 65. The tube 64 is adapted to convey lubricant or oil into the crankcase 37 of the engine, and the cap 65 is made removable for this purpose.

The oil filler pipe 64 is connected with the air-conveying tube 59 by means of a tube 67 and a housing and a housing 69 containing a control valve which is manually operable by means of an arm 71 connected to the valve. Disposed at the side of the engine block opposite the oil filler pipe is a fitting 73 which is connected to the intake manifold 40 by means of tubes or conduits 77, 78 and a valve housing 79, the latter containing a valve (not shown) for manually interrupting the flow of air through the engine crankcase into the intake manifold. The valve contained in housing 79 is equipped with a manipulating arm 80. The arm 71 secured to the valve contained in housing 69 is connected, by means of a flexible control wire 82 contained within a guiding sheath 83, with a control member 84. The arm 80 attached to the valve contained in the housing 79 is connected, by means of a flexible wire 85 contained within a sheath 86, with the control member 84 which may be conveniently positioned on the instrument panel of the vehicle or in any position convenient for the operator. A spring-biased valve (not shown) is contained in a valve casing 81 disposed between the valve housing 79 and tube 78 for automatically regulating the flow of air through the crankcase under the influence of intake manifold subatmospheric pressure under normal engine operation.

The ventilation of the engine crankcase under normal engine operation through the arrangement hereinbefore described is as follows. Air entering the inlet tube 56 passes through the air cleaner 54, through tubes 58, 59 and 60 into the carburetor 41. Some of the air is diverted past the valve contained in housing 69, through tube 67 and oil filler pipe 64 into the crankcase of the engine. The engine intake manifold 40 is connected by tubes 77 and 78, valve housing 79 and fitting 73 with the crankcase 37 of the engine. The suction or subatmospheric pressure existing in the intake manifold 40, through the reciprocatory movement of the engine pistons, is effective upon the crankcase and the chamber containing the engine valve-operating mechanism to cause a continuous circulation of clean air through the crankcase and valve chamber when the control valves contained in the housings 69 and 79 are in open position.

During submergence of the engine during stream-fording operations of the vehicle, the valves contained in housings 69 and 79 are closed by operating the control member 84 so as to interrupt the flow of air into the crankcase and valve mechanism chamber. When the air flow through the crankcase is thus interrupted, the exhaust gases which blow by the pistons create or build up a pressure in the crankcase effective to prevent seepage of water along the crankshaft bearings so that water does not enter the crankcase and valve mechanism chamber.

The present arrangement includes a method and means for establishing a pressure above atmospheric pressure in the housing 180 enclosing the vehicle clutch mechanism and the housing 200 enclosing the mechanism for establishing a drive to the front wheels of the vehicle. The pressurizing of these housings or enclosures is adapted to be invoked or utilized when the vehicle engine is in submerged or partially submerged condition and serves to prevent ingress of water along the bearings or other relatively movable components that project through the walls of one or both of the housings and to prevent water seepage at the junction of the housings with other components. The means for elevating or raising the pressure in the clutch or bell housing 180 and drive mechanism casing or housing 200 includes a pumping means actuated by the vehicle engine. The pumping means illustrated is of a multi-purpose type or dual-unit type utilized for feeding fuel to the carburetor 41 and providing subatmospheric pressure to augment the subatmospheric pressure in the intake manifold 40 for operating the windshield wiper mechanism or other mechanism of the vehicle adapted to be actuated by subatmospheric pressure. A pumping means 95 of the character utilized for the above-mentioned purposes is illustrated in detail in Figures 3, 4 and 7. The pumping means is inclusive of a main body 97 which is secured to a wall of the engine crankcase 37 through the medium of securing bolts 98. The body 97 is of hollow configuration and communication with the crank chamber of the engine is established through the passage 99 shown in Figures 4 and 7. A central chamber 100 in the body 97 accommodates an arm 102 and a pair of identical arms 103 which are pivoted upon a pin or stub shaft 105. Also pivotally supported upon the pin 105 is an operating or rocker arm 107 having a pad portion 108 in constant engagement with the peripheral surface of an eccentric 110 forming a part of the engine camshaft 112. The arms 102 and 103 are separated by the leg portions of a U-shaped sheet metal member 113 which is urged in a counterclockwise direction, as viewed in Figure 4, under the influence of an expansive coil spring 114, the leg portions of member 113 having openings to accommodate the pin 105. The member 113 engages the rocker arm 107 and, under the influence of spring 114, constantly maintains the pad portion 108 in engagement with the cam or eccentric 110.

Disposed at the upper portion of the body 97 is a pumping chamber 118 formed within a member 119 secured to the body 97 by bolts 117. Disposed between the body 97 and member 119 is a flexible diaphragm or pumping member 120 which forms one wall of the pumping chamber 118. Disposed above the diaphragm 120 is an integral portion 122 formed integrally with the member 119 and spacing the pumping chamber 118 from a manifold chamber 124. Disposed within openings or ports formed in portion 122 are an inlet valve 126 and an outlet valve 127. The member 119 is adapted to receive a cover member 129 and a pulsator or stretchable membrane 130 is disposed between member 119 and the cover 129 adapted to be stretched by pump pressure to establish a continuous pressure on fuel to be conveyed to the carburetor. The central zone of portion 122 of member 119 is provided with a wall or partition 132 which, with the membrane 130, provides an inlet manifold chamber 134 and outlet manifold chamber 135. The inlet chamber 134 is connected with an inlet duct or tube 136, and the outlet chamber 135 is connected with an outlet duct or tube 138. The tube 136 is in communication with a fuel supply tank (not shown), and the outlet tube 138 is connected to a carburetor 41. Thus, the movement of the diaphragm 120 causes fuel to be conveyed or moved from the fuel supply through tube 136, past the valve 126 into the chamber 118, thence through the valve 127 and tube 138 to the carburetor under pressure.

The diaphragm 120 is reinforced by metal discs 140 which are secured in contact with the diaphragm by a flange 142 formed on a rod 144 and a collar 145 swaged or fastened to the upper end of the rod 144. The rod 144 is formed at its lower end with a flattened link portion 146 provided with an eye to receive a hook-like portion 147 formed at the extremity of arm 102.

The body 97 is formed with a circular wall 150 and a ledge 151. Mounted on the ledge 151 is a collar 153 which supports an expansive coil spring 154. The expansive pressure of spring 154 normally urges the diaphragm 120 upwardly and provides the pressure for the fuel-pumping stroke or movement of the diaphragm 120. The inlet stroke, or downward movement of the diaphragm 120, is obtained by cam 110 moving the arm 107 in a clockwise direction about the axis of pin 105, as viewed in Figure 4, which causes a downward movement of the rod 144 and the diaphragm. Thus downward movement of the diaphragm 120 establishes the suction cycle to admit fuel from the supply inlet past the valve 126 into the chamber 118. When the cam 110 permits a counterclockwise movement of arm or lever 107, the downwardly acting pressure upon arm 102 is relieved, permitting the expansive pressure of the spring 154 to move the diaphragm 120 upwardly on its pressure stroke which forces the fuel from chamber 118 past valve 124 into chamber 135, thence through the outlet tube 138 to the carburetor 41. In this manner fuel is constantly supplied to the carburetor during engine operation.

When the fuel pressure in chamber 118 becomes sufficient to compress the spring 154, the diaphragm 120 is maintained in its lowermost position by the pressure in chamber 118. With the diaphragm 120 in its lowermost position, the eye portion 146 of link or rod 144 is disposed in its lowermost position out of the effective stroke of the hook-like portion 147 of the actuating lever 102. The lever or arm 102 may continue to oscillate under the influence of the rotation of cam 110 due to frictional contact between the arm 102 and the adjacent portions of member 113, but no movement will be transferred through link 144 to the diaphragm 120 until fuel in chamber 118 moves into the carburetor and fuel pressure thereby lowered in chamber 118. Through this arrangement and the elastic membrane 130, a predetermined pressure is impressed upon the chamber 118 at all times during operation of the engine.

The pumping unit 95 contains a pumping means for establishing a zone of subatmospheric pressure or suction for operating devices, such as windshield wipers or the like, motivated by differential pressures and for assisting in pressurizing the crankcase, clutch and power transmission enclosures. The pumping means is provided with a section 160 provided with a pumping diaphragm 162 connected by a rod or link 164 with the arm or lever 103 pivotally carried upon pin 105. The suction cycle of diaphragm 162 operates through a valve (not shown) to augment subatmospheric pressure in a chamber 168 which is connected to the inlet manifold of the engine through a conduit 170. A connection 171 from the chamber 172 below the diaphragm 162 is made with the windshield wiper whereby the windshield wiper construction (not shown) is actuated by subatmospheric pressure established in the chambers 168 and 172 beneath the diaphragm 162. There is provided above the diaphragm 162 a chamber 174 which, through ports controlled by valves 166 and 176 connected with chamber 168 and chamber 100, exhausts into chamber 100 and in the crankcase 37, which pressure from chamber 174 supplements the crankcase pressure established by gases which escape into the crankcase past the piston rings when ventilation of the crankcase is interrupted by closing valves in housings 69 and 79 shown in Figure 6.

The operation of the pumping means, through the action of diaphragm 162, is as follows. The chambers 168 and 172 are connected to the inlet manifold 40 of the engine through the tube 170 so that, during engine operation, a subatmospheric pressure exists in chambers 168 and 172. A port adjacent one of valves 167 (shown in Figure 4) connects chamber 172 with the tube 171 from the windshield wiper and the port adjacent the other valve (not shown) is arranged between chamber 168 and chamber 172. Chamber 168 is also in communication with chamber 174 by means of passage 161. The valves 167 are arranged so that during the up stroke, or suction stroke, of the diaphragm 162 suction is impressed or set up in chamber 172, and this action supplements the suction of the inlet manifold effective through tube 171 so that when the engine manifold suction is low, the pumping action of diaphragm 162 increases or augments the subatmospheric pressure so that substantial suction or reduced pressure is continuously effective in chamber 172 and to operate the windshield wiper mechanism.

The chamber 174 above the diaphragm 162, being in communication by means of passage 161 with chamber 168, is effective through the down strokes of the diaphragm 162 to exhaust gas from chamber 168, past the valve 166, to supplement the suction impressed in chamber 168 through the up strokes of diaphragm 162.

On the up stroke of diaphragm 162, the air or gas in chamber 174 is forced past valve 176 to build up or augment pressure in the crankcase 37 when the ventilation of the crankcase is interrupted for submerged operation, or, under normal conditions of engine operation, to exhaust the air or gas into the crankcase from which it is conveyed into the intake manifold through tubes 77 and 78.

The arrangement of the invention is inclusive of means for transmitting pressure set up in the crankcase 37 and chamber 100 to the housing 180 enclosing the clutch mechanism and housing 200 enclosing drive mechanism for the front wheels so that, when the vehicle is in submerged condition, elevated pressure thus established in the housings 180 and 200 prevents seepage of water into the housings at the zones of juncture of the housings with adjacent housings enclosing components of the power transmission system of the vehicle. To this end, a fitting 184, shown in Figures 3 and 4, is threaded into an opening formed in a wall of the pumping unit 95, a tube 187 being connected with the fitting 184. Secured to the tube 187 is an enclosure or sleeve 190 in which is disposed a ball check valve 191 which is biased toward closed position under the influence of a coil spring 192 contained in a bore in the sleeve or member 190. A tube 194 connects the check valve housing or sleeve 190 with a T-shaped fitting 196, shown in Figures 1, 2 and 5, the latter being in communication with the interior of the housing 180. A fitting 197 is threaded into the sleeve 190 for securing the tube or conduit 194 to the sleeve 190 and forms a seat or abutment for the check valve spring 192 as shown in Figure 3. Tube 187 is secured to sleeve 190 by means of a fitting 193.

It should be noted that the ball check valve 191 is movable in an upward direction, as viewed in Figure 3, under pressure developed in the crankcase 37 to facilitate the flow of gases under crankcase pressure past the check valve 191 through conduit 194 into the housings 180 and 200. The check valve, under the biasing action of the spring 192, normally is closed to prevent flow of air or gas from the clutch housing 180 into the crankcase during normal engine operation but is opened under pressure developed in the crankcase which is transmitted to the housings 180 and 200 when the engine is conditioned for submerged operation.

The purpose of pressurizing the housing 200 is to prevent seepage or ingress of water into the housing at the journal means through which the stub shaft 204 projects for connection through a universal joint 205 with the front wheel drive shaft 202. To convey crankcase pressure to housing 200, a conduit or tube 208 is connected with the T-shaped fitting 196 at one end and at its other end with a fitting 210 disposed in a threaded opening in the wall of the housing 200.

The normal operation of the engine and the engine crankcase ventilation system is as follows. The valve in housing 69 from the air tube 59 to the oil filler tube 64 is open and valve in housing 79 between the inlet manifold 40 and the fitting 73 into the crankcase 37 is open. With the valves in housings 69 and 79 in open position during engine operation, the suction in the inlet manifold 40 impresses subatmospheric pressure in the tubes 78 and 77 leading to the crankcase through the fitting 73 so that suction is effective in the intake manifold to draw fumes and gases from the crankcase into the intake manifold and thence into the cyclinders of the engine. The subatmospheric pressure or suction thus impressed or established in the crankcase 37 causes air to flow through the tube 56, air cleaner 54, tube 58, past the valve in housing 69, through tube 67 and oil filler pipe 64 into the crankcase. By this means, a normal ventilation of the engine crankcase is obtained by continuous flow of clean air passing through the air cleaner or filter 54 and through the crankcase.

When it is desired to operate the engine in submerged condition, the pressurizing system for setting up pressure in the engine crankcase 37, the clutch or bell housing 180 and the housing 200 shown in Figure 5 is established in the following manner. The valves in housings 69 and 79 are closed by manipulation of the operating means 84 through the flexible cables contained in the sheaths 83 and 86. The closing of these valves isolates the engine crankcase from the air intake 56 and the inlet manifold 40. With the crankcase ventilation thus interrupted, the gases of combustion escaping past the pistons and piston rings into the crankcase 37 build up pressure in the crankcase above atmospheric pressure by ingress of the piston "blowby" gases. This pressure may build up to as much as four or five pounds and serves as an effective means in the crankcase to prevent seepage or ingress of water along the crankshaft journals. The pressure building up in the crankcase 37 is communicated through the interior chamber 100 of the pumping unit 95 to the tube 187 connected with the check valve construction within the sleeve 190. The pressure in the conduit 187 acts against the ball check valve 191 to open the same, permitting gases from the crankcase to flow through the tube 194 and fitting 196 into the interior of the clutch or bell housing 180 to establish a pressure above atmospheric pressure in the housing 180. The gases under pressure from the crankcase also flow through tube 208 and fitting 210 into the housing 200 to impress pressure within the housing 200 and prevent seepage of water along the stub shaft 204. As the engine is operating, the diaphragm 162 in the pumping means 95 on the up stroke transfers the air or gas in the chamber 174 into the chamber 100 and crankcase 37 to augment or increase the pressure established by the piston "blowby" gases. Thus ample pressure is established within crankcase 37, the clutch or bell housing 180 and housing 200 to effectively resist the ingress of water into these chambers or housings.

To restore the engine to normal operation, the handle means 84 is manually operated to open the valves in housings 69 and 79 and re-establish circulation of air through the crankcase and through the fitting 73, tubes 77 and 78 and intake manifold 40 to ventilate the crankcase in the normal manner. When the pressure is thus lowered or relieved in crankcase 37, the spring 192 biases the check valve 191 to closed position as shown in Figure 4 so that gases will not be drawn in a reverse direction through the tube 187 from the bell housing 180 and housing 200 during normal operation of the engine. Due to the fact that during normal or unsubmerged operation of the engine the crankcase 37 and chamber 100 of the pumping means are vented into the manifold 40, the strokes of the diaphragm 162 forcing gases from chamber 174 past valve 176 will not appreciably increase the pressure in the crankcase 37 and chamber 100 as such gases will be drawn continuously into the manifold 40. However, as soon as the engine crankcase ventilation is stopped or interrupted by manually closing the valves in housings 69 and 79, the pumping action of diaphragm 162, forcing gases in chamber 174 into the chamber 100, augments the rising pressure in the crankcase to effectively pressurize the chambers and housings in the manner described above.

The housing 180 may be provided with a drain plug or valve 220 for the purpose of draining away oil that may seep into the housing 180 from the transmission housing 182. In installations provided with valve 220, this valve is normally in opened condition and is closed only when the engine and exhaust mechanism are to be submerged. While valve 220 is illustrated as a conventional, manually operated valve, it is to be understood that an operating means may be connected with the valve whereby it may be manipulated from the driver's compartment of the vehicle. In some installations a threaded plug may be used in lieu of valve 220 and the plug must be inserted before submergence takes place.

It is apparent that, within the scope of the invention, modifications and different arrangements may be made other than is herein disclosed, and the present disclosure is illustrative merely, the invention comprehending all variations thereof.

I claim:

1. A method for operating an engine and enclosed power transmission mechanism for the drive wheels of an automotive vehicle while submerged wherein under normal operation air is circulated in an engine crankcase through an air inlet and outlet including the steps of closing the air inlet into the crankcase, closing an air outlet from the crankcase, and directing air under pressure into the crankcase and into the enclosure for the power transmission mechanism to establish a pressure therein above atmospheric pressure when the engine of the vehicle is submerged.

2. A method for operating an internal-combustion engine and power transmission gearing of an automotive vehicle while submerged wherein under normal operation air at atmospheric pressure is circulated in the engine crankcase through an air inlet and outlet, the housing enclosing the gearing having a vent passage open to the atmospheric, including the steps of closing the normal air inlet into the engine crankcase, closing the air outlet from the crankcase, closing the vent passage in the housing, and directing air under pressure into the crankcase and housing to establish pressure in the crankcase and housing above atmospheric pressure when the engine and housing are submerged.

3. A method for operating an internal-combustion engine and enclosed power transmission gearing for the drive wheels of an automotive vehicle while submerged wherein under normal operation air is circulated through the engine crankcase including the steps of interrupting the flow of air through the crankcase, and directing air into the crankcase and the housing enclosing the power transmission gearing to establish pressure above atmospheric pressure in the crankcase and housing when the engine and housing are submerged.

4. In combination with an internal-combustion engine having a crankcase, a housing enclosing power transmission mechanism adapted to be driven by the engine, said crankcase having air inlet and outlet passages for circulating air through the crankcase, means for interrupting the circulation of air through the crankcase, a pump adapted to be driven by the engine, connections from said pump to the crankcase and the housing enclosing the mechanism, said pump being arranged to establish fluid pressure above atmospheric pressure in said crankcase and said housing when the circulation of air through the crankcase is interrupted, and means arranged between the pump and the housing for preventing fluid flow to the pump from the housing.

5. In combination with an internal-combustion engine having a crankcase, a housing enclosing power transmission gearing adapted to be driven by the engine, said crankcase having air inlet and outlet passages for circulating air through the crankcase, valve means for closing said inlet and outlet passages, a pump adapted to be driven by the engine, connections from said pump to the crankcase and the housing enclosing the gearing, said pump being arranged to establish fluid pressure above atmospheric pressure in said crankcase and said housing when the inlet and outlet passages of said crankcase are closed, and a check valve in the connection between the pump and the housing for preventing fluid flow to the pump from the housing.

6. In combination with an internal-combustion engine having a crankcase and an oil filler tube, a housing disposed adjacent the crankcase and enclosing power transmission gearing driven by said engine, the oil filler tube having an air inlet opening to admit air into the crankcase, valve means connected with said oil filler tube for interrupting the circulation of air through the crankcase, a pump driven by the engine and having communication with the crankcase and the housing for establishing fluid pressure above atmospheric pressure in the crankcase and housing when said valve means are closed, and a check valve arranged between the housing and the pump for preventing air flow from the housing to the pump.

7. In combination with an internal-combustion engine having a crankcase, an oil filler tube and an inlet manifold, a housing disposed adjacent the crankcase and enclosing power transmission gearing driven by said engine, the oil filler tube having an air inlet opening to admit air into the crankcase, a passage establishing communication between the crankcase and inlet manifold whereby subatmospheric pressure in the manifold effects circulation of air through the crankcase, valve means connected with said oil filler tube and the connection from the crankcase to the inlet manifold for interrupting the circulation of air through the crankcase, a pump driven by the engine and having communication with the crankcase and the housing for establishing fluid pressure above atmospheric pressure in the crankcase and housing when said valve means are closed, and a check valve arranged between the housing and the pump for preventing air flow from the housing to the pump.

8. In combination with an internal combustion engine having a crankcase and a housing enclosing power transmission mechanism connected with and operated by said engine for driving the road wheels of a vehicle, said crankcase having inlet and outlet passages for conveying air into and away from the crankcase, valve means for said passages, a pump adapted to be driven by the engine, tubular means connecting said pump with the crankcase and power transmission housing, said pump being adapted to feed air under pressure through the tubular means to the crankcase and power transmission housing when said inlet and outlet passages are closed by the valve means.

References Cited in the file of this patent
UNITED STATES PATENTS

| | | |
|---|---|---|
| 1,578,310 | Campbell et al. | Mar. 30, 1926 |
| 2,429,732 | Roos | Oct. 28, 1947 |
| 2,639,701 | Bales | May 26, 1953 |
| 2,650,577 | Bales | Sept. 1, 1953 |